(12) United States Patent
Ihara

(10) Patent No.: US 11,066,585 B2
(45) Date of Patent: Jul. 20, 2021

(54) ORGANOPOLYSILOXANE COMPOSITION AND METHOD FOR PRODUCING SAME, AND SILICONE COMPOSITION FOR MIST SUPPRESSOR AS WELL AS SOLVENT-FREE RELEASE PAPER OR RELEASE FILM

(71) Applicant: SHIN-ETSU CHEMICAL CO., LTD., Tokyo (JP)

(72) Inventor: Toshiaki Ihara, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 111 days.

(21) Appl. No.: 16/592,237

(22) Filed: Oct. 3, 2019

(65) Prior Publication Data

US 2020/0032120 A1    Jan. 30, 2020

Related U.S. Application Data

(62) Division of application No. 15/580,396, filed as application No. PCT/JP2016/064821 on May 19, 2016, now abandoned.

(30) Foreign Application Priority Data

Jun. 11, 2015   (JP) .............................. JP2015-118034

(51) Int. Cl.
| | |
|---|---|
| *C08G 77/08* | (2006.01) |
| *C09J 183/04* | (2006.01) |
| *C08L 83/14* | (2006.01) |
| *C09D 183/04* | (2006.01) |
| *C08L 83/04* | (2006.01) |
| *C08G 77/50* | (2006.01) |
| *C08G 77/20* | (2006.01) |
| *C08G 77/12* | (2006.01) |
| *C08G 77/06* | (2006.01) |

(52) U.S. Cl.
CPC ............. *C09J 183/04* (2013.01); *C08L 83/04* (2013.01); *C08L 83/14* (2013.01); *C09D 183/04* (2013.01); *C08G 77/06* (2013.01); *C08G 77/12* (2013.01); *C08G 77/20* (2013.01); *C08G 77/50* (2013.01); *C09J 2483/005* (2013.01)

(58) Field of Classification Search
CPC ......... C08L 83/04; C08L 83/14; C08G 77/06; C08G 77/08
USPC ........................................................ 528/15
See application file for complete search history.

(56) References Cited

U.S. PATENT DOCUMENTS

| | | |
|---|---|---|
| 6,586,535 B1 | 7/2003 | Clark et al. |
| 6,774,201 B2 | 8/2004 | Kilgour et al. |
| 6,805,914 B2 | 10/2004 | Clark et al. |
| 6,887,949 B2 | 5/2005 | Kilgour et al. |
| 7,135,512 B2 | 11/2006 | Kilgour et al. |
| 7,560,167 B2 | 7/2009 | Schlitzer et al. |
| 2011/0287267 A1 | 11/2011 | Hori et al. |
| 2012/0142239 A1* | 6/2012 | Budden ............... D06M 15/643 442/59 |
| 2015/0225577 A1 | 8/2015 | Tanaka et al. |
| 2017/0360690 A9* | 12/2017 | Fryfogle ................. C08L 83/04 |
| 2018/0064630 A1* | 3/2018 | Fryfogle ................ A61K 8/891 |

FOREIGN PATENT DOCUMENTS

| | | |
|---|---|---|
| JP | 2002-356667 A | 12/2002 |
| JP | 2005-343974 A | 12/2005 |
| JP | 2006-506509 A | 2/2006 |
| JP | 2006-506510 A | 2/2006 |
| JP | 2006-508206 A | 3/2006 |
| JP | 2006-290919 A | 10/2006 |
| JP | 2007-186804 A | 7/2007 |
| JP | 2010-502778 A | 1/2010 |
| JP | 2010-150537 A | 7/2010 |
| JP | 5033293 B2 | 9/2012 |
| JP | 5033294 B2 | 9/2012 |
| JP | 2012-224780 A | 11/2012 |
| JP | 2014-65877 A | 4/2014 |

OTHER PUBLICATIONS

Extended European Search Report dated Nov. 26, 2018, in European Patent Application No. 16807264.3.
International Search Report (PCT/ISA/210) issued in PCT/JP2016/064821, dated Jul. 5, 2016.
Written Opinion of the International Searching Authority (PCT/ISA/237) issued in PCT/JP2016/064821, dated Jul. 5, 2016.

* cited by examiner

*Primary Examiner* — Margaret G Moore
(74) *Attorney, Agent, or Firm* — Birch, Stewart, Kolasch & Birch, LLP

(57) ABSTRACT

An organopolysiloxane composition obtained by dissolving in a solvent an organopolysiloxane crosslinked product obtained by repeating one or more times a process of again introducing an organopolysiloxane and an organohydrogenpolysiloxane to a product, obtained by conducting an addition reaction of an organopolysiloxane of a specific structure and an organohydrogenpolysiloxane of a specific structure using a platinum group metal-based compound in 10-50 times the total mass of these polysiloxanes, and conducting an addition reaction using a platinum group metal-based compound.

4 Claims, No Drawings

ORGANOPOLYSILOXANE COMPOSITION AND METHOD FOR PRODUCING SAME, AND SILICONE COMPOSITION FOR MIST SUPPRESSOR AS WELL AS SOLVENT-FREE RELEASE PAPER OR RELEASE FILM

CROSS-REFERENCE TO RELATED APPLICATIONS

This application is a Divisional application of application Ser. No. 15/580,396, filed on Dec. 7, 2017 now abandoned, which is the National Phase under 35 U.S.C. § 371 of International Application No. PCT/JP2016/064821, filed on May 19, 2016, which claims the benefit under 35 U.S.C. § 119(a) to Patent Application No. 2015-118034, filed in Japan on Jun. 11, 2015, all of which are hereby expressly incorporated by reference into the present application.

TECHNICAL FIELD

This invention relates to a liquid organopolysiloxane composition comprising an organopolysiloxane crosslinked product, and more particularly, to an organopolysiloxane composition comprising an organopolysiloxane crosslinked product having a high crosslinking density and a low molecular weight dissolved in a solvent, a method for preparing the composition, a mist suppressant comprising the composition, and a solventless release paper or film-forming silicone composition comprising the mist suppressant.

BACKGROUND ART

Silicone gel is used in a variety of fields including cosmetics, potting agents for electric and electronic equipment, dampers, and release paper-forming silicone.

In cosmetics, cured silicone gel is ground and uniformly dispersed in a solution to produce a unique feel. In the case of potting agent, a liquid silicone composition is applied to a necessary site and cured into a gel, with which the target site is protected. As to the release paper-forming silicone, where mass scale production is desired, a solventless release paper-forming silicone composition is coated at a high speed to enhance productivity. In this step, mist generates at the site of a coating roll. The mist contains reactive silicone and platinum group metal base catalyst. If the mist deposits on the wall near the working environment and cures thereat, the resulting silicone rubber causes contamination. If the silicone scatters away as the mist from the coating surface, the coating weight of the silicone composition on the release paper surface is reduced, causing surface roughening. If the silicone deposits on release paper being manufactured, it leaves raised and depressed portions, leading to abnormal release forces. To solve the misting problem, a variety of mist suppressants were proposed as discussed below.

JP-A 2006-290919 (Patent Document 1) discloses a mist suppressant comprising a product of condensation reaction between a dual end silanol-blocked diorganopolysiloxane and an organohydrogenpolysiloxane in the presence of a tin catalyst.

Since the condensation reaction is difficult to control, reaction products of different lots have largely different degrees of polymerization (DOP). A reaction product having a higher DOP exerts a more mist-suppressing effect, but forms a high molecular weight gel-like substance and is difficult to mix in a release paper-forming silicone composition. Inversely, a reaction product having a lower DOP is easy to mix in a release paper-forming silicone composition, but exerts a less mist-suppressing effect and allows for migration of unreacted reactants and lightening of release force. Besides, the tin catalyst has the concern of toxicity, and the use of the reaction product in addition type release paper-forming silicone compositions is undesired because the tin catalyst becomes a poison to the platinum catalyst, prohibiting cure.

JP 5033293 (Patent Document 2) and JP 5033294 (Patent Document 3) disclose a mist suppressant comprising a compound obtained from reaction of a mixture of an alkenyl-containing siloxane and an organohydrogenpolysiloxane wherein either one is present in a large excess (SiH groups/alkenyl groups is at least 4.6, or alkenyl groups/SiH groups is at least 4.6) in the presence of a platinum or similar catalyst, the compound being added to a solventless release paper-forming silicone composition. This method is successful in reducing the molecular weight and viscosity of the addition reaction product by using one of the reactants in a large excess, but the same leads to a lowering of crosslinking density. Since the mist suppressing effect becomes lower, the amount of the compound blended must be increased in order to achieve a sufficient mist suppressing effect. Also after curing, the excessive functional groups have reacted with the release paper-forming silicone composition, restraining migration.

In addition to the low mist suppressing effect, the platinum catalyst remaining in the mist suppressant poses the high risk that dehydrogenation occurs with the lapse of time when the SiH groups/alkenyl groups is at least 4.6, can affect the cure step and cause a local variation of crosslinking density. Inversely, when the alkenyl groups/SiH groups is at least 4.6, the SiH groups/alkenyl groups ratio in the release paper-forming silicone composition becomes lower so that the crosslinking density varies, making it difficult to adjust the release force.

JP-A 2006-506509 (Patent Document 4) discloses a mist suppressant wherein a Q unit-containing siloxane is made oily using a compound which is obtained by incompletely reacting an organohydrogensilicon compound with a long chain olefin to form a partially substituted hydrido-silicone, and partially crosslinking a vinyl-containing MQ resin with the partially substituted hydrido-silicone. When the vinyl-containing MQ resin is added to the organohydrogensilicon compound, gelation can occur in some lots despite the same formulation, then a high molecular weight gel-like substance which is difficult to control viscosity is likely to form. The vinyl-containing MQ resin has a low rate of addition reaction, it may continue reaction with time even after the completion of reaction, leading to a viscosity buildup. In an attempt to increase the rate of addition reaction of the vinyl-containing MQ resin, the amount of platinum catalyst must be increased, prohibiting the product from being previously incorporated into a release paper-forming silicone composition as the mist suppressant. Even when the product is added at the time of use, the pot life is aggravated.

JP-A 2006-506510 (Patent Document 5) and JP-A 2006-508206 (Patent Document 6) relate to star-branched polymers useful as anti-mist additives for coating applications. The star-branched polymer is a reaction product obtained by reacting a modified organohydrogenpolysiloxane having silicon-bonded hydrogen atoms with a vinylsiloxane containing Q units ($SiO_{4/2}$ units) to form an addition reaction product, and further adding a vinylsiloxane or unsaturated functionality-containing organic compound to the addition reaction product.

These reaction products are difficult to control their viscosity and likely to form high molecular weight gels. Because of stickiness and olefin chain effect, the reaction products may produce an increased release force.

JP-A 2010-150537 (Patent Document 7) discloses a mist suppressant obtained by incorporating an equilibration polymer of a branched organopolysiloxane oligomer containing Q units ($SiO_{4/2}$ units) with a diorganosiloxane oligomer in a release paper-forming silicone composition.

The organopolysiloxane oligomer containing Q units is difficult to produce while controlling its molecular weight. Because of a large variation of molecular weight among lots and difficulty of uniform dispersion via equilibration, it is difficult to always produce a certain equilibration compound. The inclusion of Q units boosts up the release force.

JP-A 2010-502778 (Patent Document 8) discloses a branched polysiloxane component composed of a copolymer of (a) an organosilicon compound having at least two unsaturated hydrocarbon functional groups per molecule and (b) an organosilicon compound having at least two silylhydride functional groups per molecule, the branched polysiloxane component being formulated as an anti-mist additive in a silicone base coating component (release paper-forming silicone composition).

This reaction product tends to build up its viscosity and often forms a gel. The presence of silicone gel renders a coating irregular or non-uniform. Because of the platinum catalyst remaining in the branched polysiloxane component, if silylhydride functional groups are left in the branched polysiloxane component, then dehydrogenation reaction can occur during shelf storage, causing the container to be expanded or at the worst, ruptured. In a formulation having a less amount of the additive, it can induce addition reaction to the silicone base coating component during dispersion.

As discussed above, it is believed effective for misting improvement to add a silicone crosslinked product. However, since the conventional silicone gel has a hardness and non-flowing property, the presence of such silicone gel in a silicone coating may detract from smoothness, produce a release force off the desired release force, or produce a locally different release force. When the surface is rubbed, those portions where the gel is present will be rubbed off.

PRIOR ART DOCUMENTS

Patent Documents

Patent Document 1: JP-A 2006-290919
Patent Document 2: JP 5033293
Patent Document 3: JP 5033294
Patent Document 4: JP-A 2006-506509
Patent Document 5: JP-A 2006-506510
Patent Document 6: JP-A 2006-508206
Patent Document 7: JP-A 2010-150537
Patent Document 8: JP-A 2010-502778

SUMMARY OF THE INVENTION

Problems to be Solved by the Invention

An object of the invention, which has been made under the above-mentioned circumstances, is to provide an organopolysiloxane composition having an organopolysiloxane crosslinked product having a high crosslinking density and a low molecular weight dissolved in a solvent, a method for preparing the composition, a mist suppressant comprising the composition, and a solventless release paper or film-forming silicone composition comprising the mist suppressant.

Means for Solving the Problems

While the inventor reported a liquid organopolysiloxane composition in Japanese Patent Application No. 2014-128308, there is the desire for a better mist suppressing effect.

Making further investigations to produce a mist suppressant having a low viscosity and being free of a high molecular weight component, the inventor found that a low-viscosity gel composition is obtainable by effecting addition reaction in a large volume of solvent. It was desired to further enhance the mist suppressing effect of this addition reaction product. In this connection, if the crosslinking density is increased, the mist suppressing effect is improved, but a viscosity buildup arises. The presence of high molecular weight gel indicates the distribution of gel spots on the paper or film surface, inviting locally abnormal release forces.

Then, regarding a formulation wherein the product becomes a solid gel if addition reaction is effected in a solvent, the inventor has found that when addition reaction reactants are divided into plural portions and reaction is effected in plural stages, a low viscosity liquid product is obtained with no solid gel being produced. It has further been found that the reaction product obtained by effecting plural stages of addition reaction in a solvent can be filtered if it is diluted with the solvent to or below 2% by weight, and exerts a significant mist suppressing effect. The invention is predicated on this finding.

Accordingly, the invention provides an organopolysiloxane composition and a method for preparing the same, a mist suppressant, and a solventless release paper or film-forming silicone composition.

[1] An organopolysiloxane composition obtained by the steps of effecting addition reaction of an organopolysiloxane of structure having the formula (1) and an organohydrogenpolysiloxane of structure having the formula (2) in a solvent in the presence of a platinum group metal base compound, the amount of the solvent being 10 to 50 times the total weight of the polysiloxanes of formulae (1) and (2), to form a product, adding the organopolysiloxane of structure having the formula (1) and the organohydrogenpolysiloxane of structure having the formula (2) again to the product, effecting addition reaction in the presence of the platinum group metal base compound, and repeating at least one time the addition and reaction steps, thereby yielding an organopolysiloxane crosslinked product, the organopolysiloxane composition having the organopolysiloxane crosslinked product dissolved in the solvent,

wherein M is $R_3SiO_{1/2}$, $M^{Vi}$ m is $R_2PsiO_{1/2}$, D is $R_2SiO_{2/2}$, $D^{Vi}$ is $RPSiO_{2/2}$, T is $RSiO_{3/2}$, $T^{Vi}$ is $PSiO_{3/2}$, $M^H$ is $R_2HSiO_{1/2}$, $D^H$ is $RHSiO_{2/2}$, $T^H$ is $HSiO_{3/2}$, Q is $SiO_{4/2}$, R is each independently a substituted or unsubstituted $C_1$-$C_{12}$ monovalent hydrocarbon group free of aliphatic unsaturation, P is an alkenyl group: $-(CH_2)_a-CH=CH_2$ wherein a is 0 or an integer of 1 to 6, $\alpha$, $\beta$, $\gamma$, $\delta$, $\varepsilon$, $\zeta$, $\eta$, $\theta$, $l$, $\kappa$, $\lambda$, $\mu$, and $\nu$ are each independently 0 or a positive number, $\beta$, $\delta$ and $\zeta$ are not equal to 0 at the same time, $\beta+\delta+\zeta \geq 2$, $l$, $\lambda$, and $\nu$ are not equal to 0 at the same time, $l+\lambda+\nu \geq 2$, $\beta+\delta+\zeta$ and $l+\lambda+\nu$ are not equal to 2 at the same time.

[2] The organopolysiloxane composition of [1] wherein the solvent is a linear dimethylpolysiloxane having a viscosity of 1 to 500 mm²/s (25° C.).

[3] The organopolysiloxane composition of [1] or [2] wherein the organohydrogenpolysiloxane of structure having the formula (1) has a weight average molecular weight of 186 to 40,000, and the organopolysiloxane of structure having the formula (2) has a weight average molecular weight of 134 to 10,000.

[4] The organopolysiloxane composition of any one of [1] to [3] wherein the organopolysiloxane of structure having the formula (1) has a structure represented by $M^{Vi}_2D_\gamma$, $M_2D_\gamma D^{Vi}_\delta$, $M^{Vi}_3D_\gamma T_1$, $M^{Vi}_4D_\gamma T_2$, $M^{Vi}_2D_\gamma D^{Vi}_\delta$, $M^{Vi}_2D_\gamma Q_1$, or $M_\alpha D_\gamma D^{Vi}_\delta T^{Vi}_\zeta$ wherein M, $M^{Vi}$, D, $D^{Vi}$, T, $T^{Vi}$, α, γ, δ, and ζ are as defined above.

[5] The organopolysiloxane composition of any one of [1] to [4] wherein the organohydrogenpolysiloxane of structure having the formula (2) has a structure represented by $M^H_2D_\kappa$, $M_2D^H_\lambda$, $M_2D_\kappa D^H_\lambda$, $M^H_2D_\kappa T_2$, or $M_\theta D_\kappa D^H_\lambda T^H_\nu$ wherein M, D, T, $M^H$, $D^H$, $T^H$, Q, θ, κ, λ, and ν are as defined above.

[6] The organopolysiloxane composition of any one of [1] to [5] wherein the organopolysiloxane crosslinked product contains 5 to 100 mol of silethylene bonds per 1,000 mol of siloxane units.

[7] The organopolysiloxane composition of any one of [1] to [6] wherein when the organopolysiloxane crosslinked product is dissolved in a linear dimethylpolysiloxane having a viscosity at 25° C. of 20 mm²/s in a concentration of 9 to 12% by weight, the solution has a viscosity at 25° C. of 20 mm²/s to 2,000 mm²/s.

[8] The organopolysiloxane composition of any one of [1] to [7] wherein when the organopolysiloxane crosslinked product is dissolved in a linear dimethylpolysiloxane having a viscosity at 25° C. of 20 mm²/s and/or toluene in a concentration of 0.9 to 1.2% by weight, at least 95% by weight of the organopolysiloxane crosslinked product passes through a cellulose acetate cartridge filter.

[9] A method for preparing an organopolysiloxane composition comprising the steps of:
effecting addition reaction of an organopolysiloxane of structure having the formula (1) and an organohydrogenpolysiloxane of structure having the formula (2) in a solvent in the presence of a platinum group metal base compound, the amount of the solvent being 10 to 50 times the total weight of the polysiloxanes of formulae (1) and (2), to form a product,
adding the organopolysiloxane of structure having the formula (1) and the organohydrogenpolysiloxane of structure having the formula (2) again to the product,
effecting addition reaction in the presence of the platinum group metal base compound,
repeating at least one time the addition and reaction steps, thereby yielding an organopolysiloxane crosslinked product, $$M_\alpha M^{Vi}_\beta D_\gamma D^{Vi}_\delta T_\epsilon T^{Vi}_\zeta Q_\eta \quad (1)$$

$$M_\theta M^H_i D_\kappa D^H_\lambda T_\mu T^H_\nu Q_\eta \quad (1)$$

wherein M is $R_3SiO_{1/2}$, $M^{Vi}$ is $R_2PsiO_{1/2}$, D is $R_2SiO_{2/2}$, $D^{Vi}$ is RPSiO$_{2/2}$, T is RSiO$_{3/2}$, $T^{Vi}$ is PSiO$_{3/2}$, $M^H$ is $R_2HSiO_{1/2}$, $D^H$ is RHSiO$_{2/2}$, $T^H$ is HSiO$_{3/2}$, Q is SiO$_{4/2}$, R is each independently a substituted or unsubstituted $C_1$-$C_{12}$ monovalent hydrocarbon group free of aliphatic unsaturation, P is an alkenyl group: —(CH$_2$)$_a$—CH=CH$_2$ wherein a is 0 or an integer of 1 to 6, α, β, γ, δ, ε, ζ, η, θ, ι, κ, λ, μ, and ν are each independently 0 or a positive number, β, δ and ζ are not equal to 0 at the same time, β+δ+ζ≥2, ι, λ, and ν are not equal to 0 at the same time, ι+λ+ν≥2, β+δ+ζ and ι+λ+ν are not equal to 2 at the same time.

[10] The method of [9] wherein the addition reaction of first stage has a conversion rate of at least 90%.

[11] The method of [9] or [10] wherein a solvent having a boiling point of 50° C. to 200° C. is used as the solvent in the amount of 10 to 50 times the total weight of the polysiloxanes of formulae (1) and (2), addition reaction is effected plural divided times, and after the organopolysiloxane crosslinked product is obtained, vinylmethylpolysiloxane is added thereto and the solvent is then removed.

[12] A mist suppressant comprising the organopolysiloxane composition of any one of [1] to [8].

[13] The mist suppressant of [12] for use in a solventless release paper or film-forming silicone composition.

[14] A solventless release paper or film-forming silicone composition comprising
(A) 100 parts by weight of an organopolysiloxane containing at least two silicon-bonded alkenyl groups per molecule,
(B) 0.1 to 30 parts by weight of an organohydrogenpolysiloxane containing on average at least three silicon-bonded hydrogen atoms per molecule,
(C) a catalytic amount of a platinum group metal base catalyst, and
(D) 0.01 to 20 parts by weight of the mist suppressant of [12] or [13].

Advantageous Effects of the Invention

The organopolysiloxane composition of the invention contains an organopolysiloxane crosslinked product in the form of a low viscosity liquid, but not a high-molecular-weight gel which is insoluble in solvents. When the organopolysiloxane composition is added as a mist suppressant to a solventless release paper or film-forming silicone composition, it is fully dispersible in the silicone composition because of the low viscosity, and even when added in a small amount, it is effective for significantly reducing the amount of mist generated when the silicone composition is transferred to a substrate by rotating rolls at a high speed. In addition, since the organopolysiloxane composition is free of any solid gel, a silicone coating is given a smooth surface.

Embodiment for Carrying Out the Invention

The organopolysiloxane composition of the invention is defined as comprising an organopolysiloxane crosslinked product and a solvent. The organopolysiloxane crosslinked product is obtained by the steps of effecting addition reaction of an organopolysiloxane of structure having the formula (1) and an organohydrogenpolysiloxane of structure having the formula (2) in a solvent in the presence of a platinum group metal base compound, the amount of the solvent being 10 to 50 times the total weight of the polysiloxanes of formulae (1) and (2), to form a product, adding the organopolysiloxane of structure having the formula (1) and the organohydrogenpolysiloxane of structure having the formula (2) again to the product, effecting addition reaction in the presence of the platinum group metal base compound, and repeating at least one time the addition and reaction steps.

$$M_\alpha M^{Vi}_\beta D_\gamma D^{Vi}_\delta T_\epsilon T^{Vi}_\zeta Q_\eta \quad (1)$$

$$M_\theta M^H_i D_\kappa D^H_\lambda T_\mu T^H_\nu Q_\eta \quad (1)$$

Herein M is $R_3SiO_{1/2}$, $M^{Vi}$ is $R_2PSiO_{1/2}$, D is $R_2SiO_{2/2}$, $D^{Vi}$ is RPSiO$_{2/2}$, T is RSiO$_{3/2}$, $T^{Vi}$ is PSiO$_{3/2}$, $M^H$ is $R_2HSiO_{1/2}$, $D^H$ is $RHSiO_{2/2}$, $T^H$ is $HSiO_{3/2}$, Q is $SiO_{4/2}$, R is each independently a substituted or unsubstituted $C_1$-$C_{12}$ monovalent hydrocarbon group free of aliphatic unsaturation, P is an alkenyl group: —$(CH_2)_a$—CH=$CH_2$ wherein a is 0 or an integer of 1 to 6, α, β, γ, δ, ε, ζ, η, θ, l, κ, λ, μ, and ν are each independently 0 or a positive number, β, δ and ζ are not equal to 0 at the same time, β+δ+ζ≥2, l, λ, and ν are not equal to 0 at the same time, l+λ+ν≥2, β+δ+ζ and l+λ+ν are not equal to 2 at the same time.

First, reference is made to the organopolysiloxane of structure having formula (1) and the organohydrogenpolysiloxane of structure having formula (2).

$$M_\alpha M^{Vi}_\beta D_\gamma D^{Vi}_\delta T_\varepsilon T^{Vi}_\zeta Q_\eta \quad (1)$$

$$M_\theta M^H_l D_\kappa D^H_\lambda T_\mu T^H_\nu Q_\eta \quad (1)$$

In formulae (1) and (2), M, $M^{Vi}$, D, $D^{Vi}$, T, $T^{Vi}$, $M^H$, $D^H$, $T^H$, and Q represent the units shown below.

$$M=R_3SiO_{1/2}$$

$$M^{Vi}=R_2PSiO_{1/2}$$

$$D=R_2SiO_{2/2}$$

$$D^{Vi}=RPSiO_{2/2}$$

$$T=RSiO_{3/2}$$

$$T^{Vi}=PSiO_{3/2}$$

$$M^H=R_2HSiO_{1/2}$$

$$D^H=RHSiO_{2/2}$$

$$T^H=HSiO_{3/2}$$

$$Q=SiO_{4/2}$$

In the above formulae, R is each independently a substituted or unsubstituted $C_1$-$C_{12}$, preferably $C_1$-$C_6$ monovalent hydrocarbon group free of aliphatic unsaturation. Examples include alkyl groups such as methyl, ethyl, propyl, butyl, pentyl, hexyl, octyl, decyl and dodecyl, cycloalkyl groups such as cyclohexyl, aryl groups such as phenyl, naphthyl and tolyl, and substituted forms of the foregoing in which some carbon-bonded hydrogen atoms are substituted by halogen atoms, epoxy, amino, polyether, cyano, hydroxyl or the like. When a low release force is desired, it is preferred that at least 50 mol % of overall R groups be methyl.

P is an alkenyl group: —$(CH_2)_a$—CH=$CH_2$ wherein a is 0 or an integer of 1 to 6.

In the above formulae, α, β, γ, δ, ε, ζ, η, θ, l, κ, λ, and ν are each independently 0 or a positive number, β, δ and ζ are not equal to 0 at the same time, β+δ+ζ is at least 2, preferably 2 to 10, more preferably 2 to 5, l, λ, and ν are not equal to 0 at the same time, l+λ+ν is at least 2, preferably 2 to 10, more preferably 2 to 5. Further, β+δ+ζ and l+λ+ν each are not equal to 2 at the same time because of a possibility that the reaction product otherwise becomes a linear highly polymerized oil rather than the crosslinked product.

Also, α, γ, ε, and η are not equal to 0 at the same time, and particularly from the standpoint of a silethylene bond content, α+γ+ε+η preferably ranges from 1 to 1,000, more preferably from 10 to 500, and even more preferably from 50 to 400. In this case, from the standpoint of a silethylene bond content, γ preferably ranges from 1 to 1,000, more preferably from 10 to 500, and even more preferably from 50 to 400; α preferably ranges from 0 to 20, more preferably from 0 to 10, and even more preferably from 0 to 5; ε preferably ranges from 0 to 50, especially from 0 to 10; η preferably ranges from 0 to 5, especially from 0 to 1.

On the other hand, θ, κ, μ, and η are not equal to 0 at the same time, and likewise from the standpoint of a silethylene bond content, θ+κ+μ+η preferably ranges from 1 to 200, more preferably from 10 to 150, and even more preferably from 20 to 100. In this case, κ preferably ranges from 1 to 200, more preferably from 10 to 150, and even more preferably from 20 to 100; θ preferably ranges from 0 to 20, more preferably from 0 to 10, and even more preferably from 0 to 5; μ preferably ranges from 0 to 50, especially from 0 to 10; η preferably ranges from 0 to 5, especially from 0 to 1.

The organopolysiloxane of structure having formula (1) is an organopolysiloxane containing at least 2, preferably 2 to 10 silicon-bonded vinyl groups per molecule.

The vinyl content is preferably in a range of 0.001 to 1 mol/100 g, more preferably 0.01 to 0.1 mol/100 g.

The organopolysiloxane should preferably have a weight average molecular weight (Mw) of 186 to 40,000, more preferably 186 to 20,000. It is noted that the weight average molecular weight may be a Mw as measured versus polystyrene standards by gel permeation chromatography (GPC) using toluene as solvent (the same holds true, hereinafter).

Examples of the organopolysiloxane include dual end alkenyl-containing siloxanes, side chain alkenyl-containing siloxanes, single end and side chain alkenyl-containing siloxanes, and dual end and side chain alkenyl-containing siloxanes.

When expressed by structural formula, examples of the organopolysiloxane include $M^{Vi}_2 D_\gamma$, $M_2 D_\gamma D^{Vi}_\delta$, $M^{Vi}_3 D_\gamma T_1$, $M^{Vi}_4 D_\gamma T_2$, $M^{Vi}_2 D_\gamma D^{Vi}_\delta$, $M^{Vi}_2 D_\gamma Q_1$, and $M_\alpha D_\gamma D^{Vi}_\delta T^{Vi}_\zeta$. More specifically, structural examples include $M^{Vi}_2 D_{10}$, $M^{Vi}_2 D_{100}$, $M_2 D_{27} D^{Vi}_3$, $M_2 D_{97} D^{Vi}_3$, $M_2 D_{26} D^{Vi}_4$, $M_2 D_{25} D^{Vi}_5$, $M_2 D_{24} D^{Vi}_6$, $M_2 D_{96} D^{Vi}_4$, $M_2 D_{95} D^{Vi}_5$, $M^{Vi}_3 D_{100} T_1$, $M^{Vi}_4 D_{100} T_2$, $M^{Vi}_2 D_{97} D^{Vi}_1$, $M^{Vi}_2 D_{95} D^{Vi}_3$, and $M_3 D_{93} D^{Vi}_3 T^{Vi}_1$.

The organohydrogenpolysiloxane of structure having formula (2) is an organohydrogenpolysiloxane containing at least 2, preferably 2 to 100 silicon-bonded hydrogen atoms (SiH groups) per molecule. Addition reaction takes place between SiH groups on this organohydrogenpolysiloxane and vinyl groups on the organopolysiloxane having formula (1) to form an organopolysiloxane crosslinked product.

The SiH content is preferably in a range of 0.01 to 10 mol/100 g, more preferably 0.01 to 1 mol/100 g.

The organohydrogenpolysiloxane should preferably have a Mw of 134 to 10,000, more preferably 874 to 5,000.

Examples of the organohydrogenpolysiloxane include dual end to hydrogensilyl-containing siloxanes, side chain hydrogensilyl-containing siloxanes, single end and side chain hydrogensilyl-containing siloxanes, and dual end and side chain hydrogensilyl-containing siloxanes.

When expressed by structural formula, examples of the organopolysiloxane include $M^H_2 D_\kappa$, $M_2 D^H_\kappa$, $M^H_2 D_\kappa D^H_\lambda$, $M^H_3 D_\kappa T_1$, $M^H_4 D_\kappa T_2$, $M_\theta D_\kappa D^H_\lambda T^H_\nu$, and $M_4 D_{92} D^H_3 Q_1$. More specifically, structural examples include $M^H_2 D_{10}$, $M^H_2 D_{100}$, $M_2 D_{27} D^H_3$, $M_2 D_{97} D^H_3$, $M_2 D_{26} D^H_4$, $M_2 D_{25} D^H_5$, $M_2 D_{24} D^H_6$, $M_2 D_{96} D^H_4$, $M_2 D_{95} D^H_5$, $M^H_3 D_{100} T_1$, $M^H_4 D_{100} T_2$, $M^H_2 D_{97} D^H_1$, $M^H_2 D_{95} D^H_3$, and $M_3 D_{93} D^H_3 T^H_1$.

The organopolysiloxane of structure having formula (1) and the organohydrogenpolysiloxane of structure having formula (2) are preferably combined in such amounts that a molar ratio of SiH groups on the organohydrogenpolysiloxane of structure having formula (2) to alkenyl groups on the organopolysiloxane of structure having formula (1), i.e., SiH groups:alkenyl groups may be in the range of from 0.8:1 to 1.8:1, more preferably from 0.9:1 to 1.3:1.

The organopolysiloxane crosslinked product may be synthesized by the steps of effecting hydrosilylation (or addition) reaction of an organopolysiloxane of structure having formula (1) and an organohydrogenpolysiloxane of structure having formula (2) in a solvent in the presence of a platinum group metal base catalyst, the amount of the solvent being 10 to 50 times the total weight of the polysiloxanes of formulae (1) and (2), to form a product, adding the organopolysiloxane of structure having formula (1) and the organohydrogenpolysiloxane of structure having formula (2) again to the product, effecting hydrosilylation reaction in the presence of the platinum group metal base compound, and repeating at least one time the addition and reaction steps. As used herein, the term "hydrosilylation reaction" refers to the reaction that SiH groups on the organohydrogenpolysiloxane of structure having formula (2) add to vinyl groups on the organopolysiloxane of structure having formula (1) with the aid of a platinum group metal base catalyst.

By effecting reaction of plural divided portions of the organopolysiloxane of structure having formula (1) with plural divided portions of the organohydrogenpolysiloxane of structure having formula (2), there is obtained a low viscosity liquid with no solid gel being formed. The reaction product obtained from plural stages of addition reaction in the specific amount of the solvent can be filtered after it is diluted with the solvent in a crosslinked product concentration of up to 2% by weight. When used as a mist suppressant, the reaction product exerts a high mist suppressing effect.

It suffices that hydrosilylation reaction is effected plural stages, specifically 2 to 4 stages, more specifically 2 stages.

The solvent used herein may be selected from organopolysiloxanes having a viscosity at 25° C. of 1 to 500 mm$^2$/s, preferably 1 to 100 mm$^2$/s as measured by an Ostwald viscometer, ester oils and organic solvents. Examples of the low-viscosity organopolysiloxane having a viscosity at 25° C. of 1 to 500 mm$^2$/s include cyclic siloxanes such as octamethyltetrasiloxane and decamethylpentasiloxane, linear silicone oils such as low-viscosity linear dimethylpolysiloxane and linear methylphenylpolysiloxane, and branched polydialkylsiloxanes. Suitable ester oils include fatty acid esters such as isopropyl myristate, isopropyl palmitate and cetyl 2-ethylhexanoate, glycerol fatty acid esters such as glycerol tri-2-ethylhexanoate, moderate chain fatty acid triglycerides such as glycerol tricaprilate, and polyol ester oils such as trimethylolpropane methyl oleate. Suitable organic solvents include toluene, xylene, methyl ethyl ketone, hydrocarbon compounds such as isododecane, isooctane, cyclopentane, hexane, cyclohexane, and methylcyclohexane, and alcohols such as t-butyl alcohol and s-butyl alcohol. Of the above solvents, non-reactive organopolysiloxanes and solvents having a boiling point of 50 to 200° C. are preferred, with linear dimethylpolysiloxane having a viscosity at 25° C. of 1 to 500 mm$^2$/s being most preferred.

Examples of the solvent having a boiling point of 50 to 200° C. include toluene, xylene, hexane, isopropyl alcohol, cyclohexanol, cyclohexanone, methyl ethyl ketone, methyl isobutyl ketone, methylcyclohexanone, and methyl n-butyl ketone.

The amount of the solvent should be 10 to 50 times, preferably 10 to 30 times the total weight of the organopolysiloxane of structure having formula (1) and the organohydrogenpolysiloxane of structure having formula (2). If the amount of the solvent is less than 10 times the total weight of the alkenyl-containing organopolysiloxane and the organohydrogenpolysiloxane, the overall reaction composition gels. If the solvent amount is more than 50 times, the amount of crosslinked product is too small and the mist suppressing effect is insufficient.

It is noted that the amount of the solvent at the finish when plural stages of addition reaction have been completed is preferably 2 to 30 times, more preferably 5 to 15 times the weight of the resulting organopolysiloxane crosslinked product.

The platinum group metal base catalyst used herein may be any of well-known ones used as the addition reaction catalyst. Suitable platinum group metal base catalysts include, for example, platinum, palladium, rhodium and ruthenium base catalysts, with the platinum base catalysts being preferred. Examples of the platinum base catalyst include chloroplatinic acid, alcohol or aldehyde solutions of chloroplatinic acid, complexes of chloroplatinic acid with various olefins or vinylsiloxanes, and complexes of platinum with various olefins or vinylsiloxanes.

Although the amount of the platinum group metal base catalyst may be a catalytic amount, it is preferred from the standpoint of economy that the catalyst be used in an amount to give 0.1 to 100 ppm of platinum group metal based on the total weight of the organopolysiloxane of structure having formula (1) and the organohydrogenpolysiloxane of structure having formula (2), more preferably in an amount to give 0.5 to 20 ppm, and even more preferably in an amount to give 0.5 to 5 ppm of platinum group metal.

The hydrosilylation reaction takes place at normal temperature, but slowly. Thus the reaction temperature is preferably 50 to 150° C., more preferably 60 to 120° C., and the reaction time is preferably 1 to 12 hours, more preferably 2 to 6 hours.

In the practice of the invention, the reaction is performed in plural stages, yielding the organopolysiloxane crosslinked product. Herein, the addition reaction of the first stage preferably has a conversion rate of at least 90%, more preferably 95 to 100%. If the conversion rate is less than 90%, the addition reaction product of the first stage can react with the reactants of the second stage upon addition in the second stage, forming a high molecular weight product. The addition reactions of the second and later stages preferably have a conversion rate of 87 to 100%.

The amounts of the reactants, the organopolysiloxane of structure having formula (1) and the organohydrogenpolysiloxane of structure having formula (2) used in the second and later stages of reaction are each preferably 0.5 to 2 times, more preferably 0.8 to 1.2 times the amounts of the organopolysiloxane of structure having formula (1) and the organohydrogenpolysiloxane of structure having formula (2) used in the first stage of reaction.

Also, the amounts of the platinum group metal base catalyst used in the second and later stages of reaction may each be the same amount as used in the first stage of reaction, specifically an amount to give 0.1 to 100 ppm of platinum group metal based on the total weight of the organopolysiloxane of structure having formula (1) and the organohydrogenpolysiloxane of structure having formula (2), more preferably an amount to give 0.5 to 20 ppm, and even more preferably an amount to give 0.5 to 5 ppm of platinum group metal.

The organopolysiloxane crosslinked product thus obtained should preferably have an average degree of polymerization (DOP) of 5,000 to 300,000, more preferably 8,000 to 100,000. Notably, DOP may be determined as a weight average DOP versus polystyrene standards by GPC analysis (solvent toluene, column TSKgel GMHHR-H(30) of Tosoh Corp. for ultra-high molecular weight analysis).

The organopolysiloxane crosslinked product, when present in the solvent in a concentration of up to 2% by weight, can be filtered through a paper filter (Advantec No. 5A), cellulose acetate cartridge filter (DISMIC-13CP) or PTFE membrane filter (DISMIC-13JP), does not contain a high molecular weight solid gel, and is oily. Preferably, when the organopolysiloxane crosslinked product is dissolved in a linear dimethylpolysiloxane having a viscosity at 25° C. of 20 mm²/s and/or toluene in a concentration of 0.9 to 1.2% by weight, at least 95% by weight of the organopolysiloxane crosslinked product passes through the cellulose acetate cartridge filter.

Also preferably, when the organopolysiloxane crosslinked product is dissolved in a linear dimethylpolysiloxane having a viscosity at 25° C. of 20 mm²/s in a concentration of 9% by weight, the solution has a viscosity at 25° C. of from 20 mm²/s to 2,000 mm²/s, more preferably from 30 mm²/s to 1,000 mm²/s, and even more preferably from 50 mm²/s to 400 mm²/s. Notably, the viscosity is a kinematic viscosity measured at 25° C. by an Ostwald viscometer.

The organopolysiloxane crosslinked product preferably contains 5 to 100 mol, more preferably 7 to 40 mol, even more preferably 8 to 30 mol of silethylene bonds per 1,000 mol of siloxane units, as computed from $^1$H—NMR analysis. If the silethylene bond content is too low, the mist suppressing effect may be weak. If the silethylene bond content is too high, the crosslinked product may have too high a viscosity and be difficult to mix.

It is noted that when an organopolysiloxane having a viscosity at 25° C. of 1 to 500 mm²/s is used as the solvent in the reaction, a 100% siloxane composition is available. When the organopolysiloxane crosslinked product is synthesized using an organic solvent such as toluene, the reaction product may be converted to a 100% siloxane composition by adding a low-viscosity organopolysiloxane thereto and heating under vacuum to remove the organic solvent.

The low-viscosity organopolysiloxane used herein is preferably a compound of structure having the formula (3).

$$M_\alpha M^{Vi}_\beta D_\gamma D^{Vi}_\delta T_\epsilon T^{Vi}_\zeta \quad (3)$$

Herein M is $R_3SiO_{1/2}$, $M^{Vi}$ is $R_2PSiO_{1/2}$, D is $R_2SiO_{2/2}$, $D^{Vi}$ is $RPSiO_{2/2}$, T is $RSiO_{3/2}$, $T^{Vi}$ is $PSiO_{3/2}$. R is each independently a substituted or unsubstituted $C_1$-$C_{12}$ monovalent hydrocarbon group free of aliphatic unsaturation, as exemplified above. P is an alkenyl group: —$(CH_2)_a$—CH=$CH_2$ wherein a is 0 or an integer of 1 to 6, α', β', γ', δ', ε', and ζ' are each independently 0 or a positive number, α'+β'+γ'+δ'+ε'+ζ' is up to 200, preferably 10 to 150.

Examples of the low-viscosity organopolysiloxane include dimethylpolysiloxane, dimethylpolysiloxane having dimethylvinylsiloxy groups at both ends of the molecular chain, methylvinylpolysiloxane having vinyl on side chain, dimethylpolysiloxane having dimethylhydroxysilyl groups at both ends, and phenylmethylpolysiloxane having phenyl on side chain, all having a viscosity at 25° C. of 1 to 1,000 mPa·s as measured by a rotational viscometer.

Preferred are vinyl-containing polysiloxanes such as $M^{Vi}_2D_{10}$, $M^{Vi}_2D_{100}$, $M_2D_{27}D^{Vi}_3$, $M_2D_{97}D^{Vi}_3$, $M_2D_{26}D^{Vi}_4$, $M_2D_{25}D^{Vi}_5$, $M_2D_{24}D^{Vi}_6$, $M_2D_{96}D^{Vi}_4$, $M_2D_{95}D^{Vi}_5$, $M^{Vi}_3D_{100}T_1$, $M^{Vi}_4D_{100}T_2$, $M^{Vi}_2D_{97}D^{Vi}_1$, $M^{Vi}_2D_{95}D^{Vi}_3$, and $M_3D_{93}D^{Vi}_3T^{Vi}_1$. Inter alia, dimethylpolysiloxane having dimethylvinylsiloxy groups at both ends of the molecular chain is especially preferred because of its high reactivity with SiH groups.

In the organopolysiloxane composition of the invention, the organopolysiloxane crosslinked product preferably accounts for 5 to 100% by weight, more preferably 5 to 80% by weight, and even more preferably 7 to 60% by weight of the composition.

The organopolysiloxane composition is advantageously used as a mist suppressant which is an additive for reducing misting from a roll when a solventless release paper or film-forming silicone composition is coated onto a substrate at a high speed.

The solventless release paper or film-forming silicone composition having the mist suppressant formulated therein is preferably an addition reaction cure type silicone composition comprising (A) 100 parts by weight of an organopolysiloxane containing at least two silicon-bonded alkenyl groups per molecule, (B) 0.1 to 30 parts by weight of an organohydrogenpolysiloxane containing on average at least three silicon-bonded hydrogen atoms (i.e., SiH groups) per molecule, (C) a catalytic amount of a platinum group metal base catalyst, (D) 0.01 to 20 parts by weight of the mist suppressant, and optionally, (E) a reaction inhibitor.

Component (A) is an organopolysiloxane containing at least two, specifically 2 to 50 alkenyl groups per molecule, preferably a linear or branched organopolysiloxane containing alkenyl groups at ends and/or side chains, represented by the general formula (4).

[Chemical Formula 1]

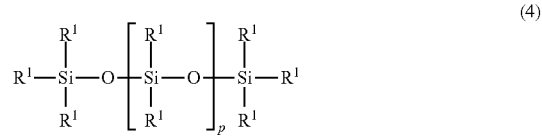

(4)

Herein $R^1$ which may be identical or different is a substituted or unsubstituted $C_1$-$C_{12}$ monovalent hydrocarbon group free of aliphatic unsaturation, an alkenyl group represented by —$(CH_2)_q$—CH=$CH_2$ wherein q is 0 or an integer of 1 to 6, or a group having the following formula (5), at least 2, preferably 2 to 50, more preferably 2 to 10 of overall groups $R^1$ are alkenyl groups, and p is a number of 1 to 1,000, preferably 10 to 300.

[Chemical Formula 2]

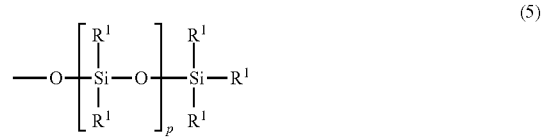

(5)

In formulae (4) and (5), examples of the substituted or unsubstituted $C_1$-$C_{12}$, preferably $C_1$-$C_6$ monovalent hydrocarbon group free of aliphatic unsaturation, represented by $R^1$, include alkyl groups such as methyl, ethyl, propyl, butyl, pentyl, hexyl, octyl, decyl and dodecyl, cycloalkyl groups such as cyclohexyl, aryl groups such as phenyl and naphthyl, and substituted forms of the foregoing in which some carbon-bonded hydrogen atoms are replaced by halogen, cyano, hydroxyl or the like. It is preferred for reducing the release force that at least 50 mol % of the total number of $R^1$ be methyl.

Component (B) is an organohydrogenpolysiloxane containing at least three silicon-bonded hydrogen atoms (i.e., SiH groups) per molecule, preferably having the general formula (6).

[Chemical Formula 3]

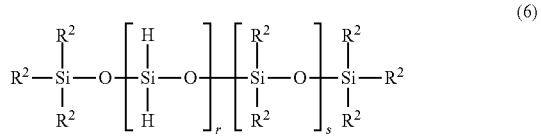

(6)

Herein $R^2$ is a substituted or unsubstituted monovalent hydrocarbon group, r is a number of 1 to 300, and s is a number of 0 to 150, satisfying r>s.

In formula (6), $R^2$ is a substituted or unsubstituted monovalent hydrocarbon group, preferably of 1 to 12 carbon atoms, more preferably 1 to 6 carbon atoms, and free of aliphatic unsaturation. Suitable monovalent hydrocarbon groups include alkyl groups such as methyl, ethyl, propyl, butyl, pentyl, hexyl, octyl, decyl and dodecyl, cycloalkyl groups such as cyclohexyl, aryl groups such as phenyl and naphthyl, and halo-substituted alkyl groups such as 3,3,3-trifluoropropyl.

The subscript r is a number of 1 to 300, preferably 10 to 100, s is a number of 0 to 150, preferably 0 to 50, and r and s satisfy r>s.

The amount of component (B) blended is preferably 0.1 to 30 parts by weight, more preferably 0.1 to 20 parts by weight per 100 parts by weight of component (A). The organohydrogenpolysiloxane as component (B) is preferably used in such an amount that a ratio of the moles of silicon-bonded hydrogen atoms in the organohydrogenpolysiloxane as component (B) to the total moles of alkenyl groups in the alkenyl-containing linear organopolysiloxane as component (A), that is, SiH groups/alkenyl groups may range from 1.0 to 3.0, more preferably from 1.6 to 2.2 on a molar basis. A SiH groups/alkenyl groups ratio of less than 1.0 may lead to insufficient cure whereas a ratio in excess of 3.0 may lead to a large change of release force with time.

The platinum group metal base catalyst as component (C) may be any of well-known ones used as the addition reaction catalyst. Suitable platinum group metal base catalysts include, for example, platinum, palladium, rhodium and ruthenium base catalysts, with the platinum base catalysts being preferred. Examples of the platinum base catalyst include chloroplatinic acid, alcohol or aldehyde solutions of chloroplatinic acid, and complexes of chloroplatinic acid with various olefins or vinylsiloxanes.

Although the amount of the platinum group metal base catalyst may be a catalytic amount, it is preferably used in an amount to give 10 to 1,000 ppm, more preferably 10 to 200 ppm of platinum group metal based on the total weight of components (A) and (B).

Component (D) is the mist suppressant defined above. Since the release paper or film-forming silicone composition is solventless, the mist suppressant is preferably free of an organic solvent, more preferably an organopolysiloxane composition consisting of 100% siloxanes as mentioned above.

The organopolysiloxane composition used herein is preferably an organopolysiloxane composition which is prepared as above through plural stages of addition reaction using a solvent having a boiling point of 50 to 200° C. as the solvent, and thereafter processed by once adding thereto a SiH group-reactive vinylmethylpolysiloxane which can be manufactured in a large volume at a low cost, and removing the solvent.

The vinylmethylpolysiloxane used herein is a methylpolysiloxane containing at least two vinyl groups per molecule, represented by the following formula:

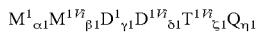

wherein $M^1$ is $Me_3SiO_{1/2}$, $M^{1Vi}$ is $Me_2ViSiO_{1/2}$, $D^1$ is $Me_2SiO_{2/2}$, $D^{1Vi}$ is $MeViSiO_{2/2}$, $T^1$ is $MeSiO_{3/2}$, $T^{1Vi}$ is $ViSiO_{3/2}$, $Q^1$ is $SiO_{4/2}$, Me is methyl, Vi is vinyl, $\alpha 1$, $\beta 1$, $\gamma 1$, $\delta 1$, $\epsilon 1$, $\zeta 1$, and $\eta 1$ are each independently 0 or a positive number, $\beta 1$, $\delta 1$, and $\zeta 1$ are not equal to 0 at the same time, and $\beta 1+\delta 1+\zeta 1 \geq 2$; and especially a dimethylpolysiloxane having dimethylvinylsiloxy groups at both ends, represented by $M^{1Vi}_{\beta 1}D^1_{\gamma 1}$ wherein $M^{1Vi}$ and $D^1$ are as defined above, $\beta 1$ is 2, and $\gamma 1$ is 1 to 200.

The amount of the mist suppressant blended is preferably 0.01 to 20 parts by weight, more preferably 0.1 to 5 parts by weight per 100 parts by weight of component (A). If the amount of the mist suppressant blended is too small, no mist suppressing effect may be observable. If the amount of the mist suppressant blended is too large, the overall composition may have too high a viscosity and a release force off the desired value.

Component (F) is a reaction inhibitor, which is blended if necessary and serves to control the activity of the platinum group metal base catalyst. Included are organonitrogen compounds, organophosphorus compounds, acetylene compounds, oxime compounds, and organic chloro compounds. Examples include acetylene alcohols such as 3-methyl-1-butyn-3-ol, 1-ethynyl-1-cyclohexanol, 3,5-dimethyl-1-hexyn-3-ol, 3-methyl-1-penten-3-ol, and phenylbutynol, acetylene compounds such as 3-methyl-3-1-penten-1-yne and 3,5-dimethyl-1-hexyn-3-yne, the reaction products of these acetylene compounds with alkoxysilanes or siloxanes, or hydrogensilanes or siloxanes, cyclic tetramethylvinylsiloxane, vinylsiloxanes such as 1,3-divinyl-1,1,3,3-tetramethyldisiloxane, organonitrogen compounds such as benzotriazole, other organophosphorus compounds, oxime compounds, and organic chloro compounds.

When used, the amount of reaction inhibitor (E) blended is sufficient to provide satisfactory processing bath stability and typically 0 to 5 parts by weight, preferably 0.01 to 3 parts by weight per 100 parts by weight of component (C).

To the solventless release paper or film-forming silicone composition, an antioxidant, pigment, stabilizer, antistatic agent, defoamer, adhesion improver, and inorganic filler (e.g., silica) may be blended as optional additive components as long as the objects of the invention are not impaired.

The solventless release paper or film-forming silicone composition may be prepared by mixing the foregoing components according to the standard procedure until uniform.

The solventless release paper or film-forming silicone composition thus obtained preferably has a viscosity at 25° C. of 50 to 1,000 mm$^2$/s, especially 100 to 500 mm$^2$/s, as measured by an Ostwald viscometer.

On practical use of the solventless release paper or film-forming silicone composition, the release paper or film-forming silicone composition as such is applied onto a substrate such as paper or film using a suitable coating technique such as roll coating, reverse coating or gravure coating, in a coating weight of 0.01 to 100 g/m², more preferably 0.5 to 5 g/m², and heated at 50 to 200° C., preferably 90 to 180° C. for 1 to 120 seconds, preferably 3 to 30 seconds, to form a cured coating on the substrate.

The solventless release paper or film-forming silicone composition having the inventive mist suppressant formulated therein exerts a mist suppressing effect particularly when roll coating is employed. When the silicone composition is applied by roll coating, the silicone composition generates little mist when the coating speed is less than 200 m/min, but starts misting when the coating speed is equal to or higher than 200 m/min. The amount of mist generated increases as the coating speed is accelerated.

Examples of the substrate used herein include paper sheets such as glassine paper, polyethylene laminated paper, kraft paper, clay coated paper and mirror coated paper, and plastic films such as polypropylene, polyethylene, polyethylene terephthalate, and polyvinyl chloride.

It is noted that the inventive mist suppressant has no impact on the release force of the cured product of the solventless release paper or film-forming silicone composition.

EXAMPLE

Synthesis Examples, Examples, and Comparative Examples are given below by way of illustration and not by way of limitation. The viscosity reported below is as measured at 25° C. by an Ostwald viscometer.

In the Examples below, symbols indicative of the composition of siloxanes designate the following units.

$M=(CH_3)_3SiO_{1/2}$ $M^{Vi}=(CH_2=CH)(CH_3)_2SiO_{1/2}$ $D=(CH_3)_2SiO_{2/2}$ $D^H=(CH_3)HSiO_{2/2}$ $T=(CH_3)SiO_{3/2}$

[Synthesis Example 1] Synthesis of Mist Suppressant Used in Examples 1 and 2

Linear methylhydrogenpolysiloxane represented by $M_2D_{24.6}D^H{}_2$, 10 g, and 48 g (SiH groups:vinyl groups=1 mol:1.097 mol) of branched vinylmethylpolysiloxane represented by $M^{Vi}{}_{2.4}D_{147.7}T_{0.4}$ were mixed in 911 g (corresponding to 15.7 times the total weight of linear methylhydrogenpolysiloxane and branched vinylmethylpolysiloxane) of dimethylpolysiloxane having a viscosity at 25° C. of 20 mm²/s. A platinum catalyst having vinylmethylpolysiloxane coordinated was added in an amount to give 2 ppm of platinum based on the total weight of the reaction system. The system was heated whereupon reaction was run at a temperature of 80° C. for 5 hours. The reaction product thus obtained was present in the solution in a concentration of 5% by weight and was an oil having a viscosity of 42 mm²/s, a hydrogen gas evolution of 0.12 ml/100 g and a conversion rate of 99.5%.

To the composition of the reaction product in dimethylpolysiloxane, 10 g of linear methylhydrogenpolysiloxane represented by $M_2D_{24.6}D^H{}_2$ and 48 g of branched vinylmethylpolysiloxane represented by $M^{Vi}{}_{2.4}D_{147.7}T_{0.4}$ were added again. With stirring, a platinum catalyst having vinylmethylpolysiloxane coordinated was added in an amount to give 2 ppm of platinum based on the total weight of the reaction system. The reaction was run at a temperature of 80° C. for 5 hours. The organopolysiloxane crosslinked product thus obtained was present in the solution in a concentration of 11.29% by weight and was an oil having a viscosity of 135 mm²/s, a hydrogen gas evolution of 0.08 ml/100 g and a conversion rate of 99.8%. It had 13.3 mol of silethylene bond per 1,000 mol of siloxane units as computed from ¹H-NMR analysis.

To 10 g of the composition of the organopolysiloxane crosslinked product in dimethylpolysiloxane, 90 g of toluene was added and mixed. The solution contained the organopolysiloxane crosslinked product in a concentration of 1.1% by weight, and could be filtered through a cellulose acetate cartridge filter DISMIC-13CP (Advantec Group). The organopolysiloxane crosslinked product as filtered had a weight average molecular weight of 3.5×10⁶. The Mw was determined by GPC-MALS under the following conditions: GPC HLC-8120 (Tosoh Corp.), column TSKgel GMHHR-H (30)×2 (Tosoh Corp.), eluent toluene, detector MALS DAWN HELEOS (Wyatt Technology).

[Synthesis Example 2] Synthesis of Mist Suppressant Used in Example 3

Linear methylhydrogenpolysiloxane represented by $M_2D_{24.6}D^H{}_2$, 10 g, and 48 g (SiH groups:vinyl groups=1 mol:1.097 mol) of branched vinylmethylpolysiloxane represented by $M^{Vi}{}_{2.4}D_{147.7}T_{0.4}$ were mixed in 911 g (corresponding to 15.7 times the total weight of linear methylhydrogenpolysiloxane and branched vinylmethylpolysiloxane) of toluene. A platinum catalyst having vinylmethylpolysiloxane coordinated was added in an amount to give 2 ppm of platinum based on the total weight of the reaction system. The system was heated whereupon reaction was run at a temperature of 80° C. for 5 hours. The reaction product thus obtained was present in the solution in a concentration of 11% by weight and had a viscosity of 1.7 mm²/s, a hydrogen gas evolution of 0.12 ml/100 g and a conversion rate of 99.5%.

To the composition of the reaction product in toluene, 10 g of linear methylhydrogenpolysiloxane represented by $M_2D_{24.6}D^H{}_2$ and 48 g of branched vinylmethylpolysiloxane represented by $M^{Vi}{}_{2.4}D_{147.7}T_{0.4}$ were added again. With stirring, a platinum catalyst having vinylmethylpolysiloxane coordinated was added in an amount to give 2 ppm of platinum based on the total weight of the reaction system. The reaction was run at a temperature of 80° C. for 5 hours. The solution of the organopolysiloxane crosslinked product thus obtained had a viscosity of 5.4 mm²/s, and the organopolysiloxane crosslinked product had a hydrogen gas evolution of 0.07 ml/100 g and a conversion rate of 99.8%. It had 13 mol of silethylene bond per 1,000 mol of siloxane units as computed from ¹H-NMR analysis.

To 10 g of the composition of the organopolysiloxane crosslinked product in toluene, 90 g of toluene was added and mixed. The solution contained the organopolysiloxane crosslinked product in a concentration of 1.1% by weight, and could be filtered through a cellulose acetate cartridge filter DISMIC-13CP (Advantec Group). The organopolysiloxane crosslinked product as filtered had a Mw of 3.3×10⁶.

To the composition of the organopolysiloxane crosslinked product in toluene, 58 g of dimethylpolysiloxane having vinyl groups at both ends, represented by $M^{Vi}{}_2D_{66.8}$ was added. Under nitrogen bubbling, this was distilled at 150° C. for 2 hours and under a vacuum of 10 mmHg or below, obtaining a 100% siloxane composition. The composition had a viscosity of 2,495 mm²/s.

[Synthesis Example 3] Synthesis of Mist Suppressant Used in Example 4

Side chain methylhydrogenpolysiloxane represented by $M_2D_{24}D^H_4$, 10 g, and 109.3 g (SiH groups:vinyl groups=1 mol:1.097 mol) of dual terminated vinylmethylpolysiloxane represented by $M^{Vi}_2D_{144}$ were mixed in 2,386 g (corresponding to 20 times the total weight of side chain methylhydrogenpolysiloxane and dual terminated vinylmethylpolysiloxane) of dimethylpolysiloxane having a viscosity at 25° C. of 20 mm²/s. A platinum catalyst having vinylmethylpolysiloxane coordinated was added in an amount to give 2 ppm of platinum based on the total weight of the reaction system. The system was heated whereupon reaction was run at a temperature of 80° C. for 5 hours. The reaction product thus obtained was present in the solution in a concentration of 4.76% by weight and was an oil having a viscosity of 780 mm²/s, a hydrogen gas evolution of 0.0 ml/100 g and a conversion rate of 100%.

To the composition of the reaction product in dimethylpolysiloxane, 10 g of side chain methylhydrogenpolysiloxane represented by $M_2D_{24}D^H_4$ and 109.3 g of dual terminated vinylmethylpolysiloxane represented by $M^{Vi}_2D_{144}$ were added again. With stirring, a platinum catalyst having vinylmethylpolysiloxane coordinated was added in an amount to give 2 ppm of platinum based on the total weight of the reaction system. The system was heated whereupon reaction was run at a temperature of 80° C. for 5 hours. The organopolysiloxane crosslinked product thus obtained was present in the solution in a concentration of 9% by weight and was an oil having a viscosity of 2,507 mm²/s, a hydrogen gas evolution of 0.006 ml/100 g and a conversion rate of 98.0%. It had 15.2 mol of silethylene bond per 1,000 mol of siloxane units as computed from ¹H-NMR analysis.

To 10 g of the composition of the organopolysiloxane crosslinked product in dimethylpolysiloxane, 90 g of toluene was added and mixed. The solution contained the organopolysiloxane crosslinked product in a concentration of 0.9% by weight, and could be filtered through a cellulose acetate cartridge filter DISMIC-13CP (Advantec Group). The organopolysiloxane crosslinked product as filtered had a Mw of 3.3×10⁶.

[Synthesis Example 4] Synthesis of Mist Suppressant Used in Comparative Example 1

Linear methylhydrogenpolysiloxane represented by $M_2D_{24.6}D^H_2$, 20 g, and 96 g (SiH groups:vinyl groups=1 mol:1.097 mol) of branched vinylmethylpolysiloxane represented by $M^{Vi}_{2.4}D_{147.77}T_{0.4}$ were mixed in 1,044 g (corresponding to 9 times the total weight of linear methylhydrogenpolysiloxane and branched vinylmethylpolysiloxane) of toluene. A platinum catalyst having vinylmethylpolysiloxane coordinated was added in an amount to give 2 ppm of platinum based on the total weight of the reaction system. On heating, the system gelled when the temperature reached about 70° C.

[Synthesis Example 5] Synthesis of Mist Suppressant Used in Comparative Example 2

Linear methylhydrogenpolysiloxane represented by $M_2D_{24.6}D^H_2$, 20 g, and 96 g (SiH groups:vinyl groups=1 mol:1.097 mol) of branched vinylmethylpolysiloxane represented by $M^{Vi}_{2.4}D_{147.7}T_{0.4}$ were mixed in 1,044 g (corresponding to 9 times the total weight of linear methylhydrogenpolysiloxane and branched vinylmethylpolysiloxane) of dimethylpolysiloxane represented by $M_2D_{27}$. A platinum catalyst having vinylmethylpolysiloxane coordinated was added in an amount to give 2 ppm of platinum based on the total weight of the reaction system. On heating, the system gelled when the temperature reached about 70° C.

[Synthesis Example 6] Synthesis of Mist Suppressant Used in Comparative Example 3

Linear methylhydrogenpolysiloxane represented by $M_2D_{24.6}D^H_2$, 10 g, and 48 g (SiH groups:vinyl groups=1 mol:1.097 mol) of branched vinylmethylpolysiloxane represented by $M^{Vi}_{2.4}D_{147.7}T_{0.4}$ were mixed in 911 g (corresponding to 15.7 times the total weight of linear methylhydrogenpolysiloxane and branched vinylmethylpolysiloxane) of dimethylpolysiloxane having a viscosity at 25° C. of 20 mm²/s. A platinum catalyst having vinylmethylpolysiloxane coordinated was added in an amount to give 2 ppm of platinum based on the total weight of the reaction system. The system was heated whereupon reaction was run at a temperature of 80° C. for 5 hours. The reaction product thus obtained was present in the solution in a concentration of 5% by weight and was an oil having a viscosity of 42 mm²/s, a hydrogen gas evolution of 0.12 ml/100 g and a conversion rate of 99.5%. It had 7.4 mol of silethylene bond per 1,000 mol of siloxane units as computed from ¹H-NMR analysis.

Examples 1 to 4 and Comparative Examples 1 to 4

A silicone composition was prepared according to the procedure shown below by blending each of the mist suppressants prepared in the above Synthesis Examples in the basic composition described below, and cured.

Notably, the viscosity of the silicone composition was measured by the aforementioned method. The amount of mist generated from the silicone composition, the release force of a cured coating of the silicone composition and residual adhesion were measured by the following test methods. All the silicone compositions cured without any problems.

<Preparation of Silicone Composition>

Silicone compositions were prepared by combining 100 parts by weight of dimethylpolysiloxane having vinyldimethylsiloxy groups at both ends, represented by the formula (7):

[Chemical Formula 4]

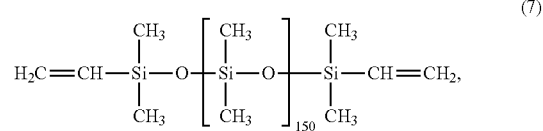

(7)

2.7 parts by weight of methylhydrogenpolysiloxane represented by the formula (8):

[Chemical Formula 5]

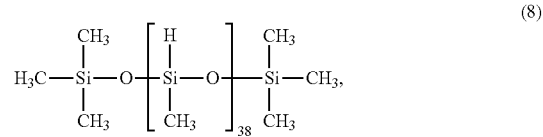

(8)

0.4 part by weight of ethynyl cyclohexanol, and 2 parts by weight (100 ppm on platinum weight basis) of a complex salt of chloroplatinic acid with vinylsiloxane to form a base compound, blending 1 or 2 parts by weight of the mist suppressants prepared in the above Synthesis Examples in the base compound, and thoroughly mixing the ingredients. The formulation is shown in Tables 1 and 2.

<Method of Measuring Misting Amount>

The misting amount was measured by coating 1.6 g of the silicone composition on the roller at the top of Misting Tester (Toyo Seiki Ltd.), rotating three rollers at 1,400 rpm, and measuring the amount of generated mist by Dusttrak Aerosol Monitor Model 8520 (TSI Inc.). One opening of a vinyl tube having an inner diameter of 7 mm was placed 15 cm straight above the top roller while the other opening was coupled to the suction site of Dusttrak Aerosol Monitor. While mist measurement was continued for 180 seconds, the maximum was recorded. The maximum detection limit of Dusttrak Aerosol Monitor is 150 mg/m$^3$. The results are shown in Tables 1 and 2.

<Method of Curing Silicone Composition>

The silicone composition prepared above was coated onto a polyethylene-laminated paper substrate in a coating weight of 0.9 to 1.1 g/m$^2$ by RI coater (IHI Machine System), to and heated in a hot air dryer at 140° C. for 30 seconds. The coated substrate designated as silicone separator was used in the following measurements.

<Surface State of Coated Sample>

The silicone separator obtained by the above method was visually observed on its surface and rated "0" for satisfactory coating, "Δ" for coating with an acceptable level of slight asperities or foreign particles, and "X" for coating with asperities or foreign particles. The results are shown in Tables 1 and 2.

<Method of Measuring Release Force>

A sample was prepared by holding the silicone separator obtained by the above method at 25° C. for 20 hours, then attaching TESA-7475 tape thereto, and holding the assembly under a load of 20 g/m$^2$ in a dryer at 70° C. for 20 hours. Using a tensile tester, the TESA-7475 tape was peed from the sample at an angle of 180° and a rate of 0.3 m/min. The force required for peeling is reported as release force (gf/25 mm). The results are shown in Tables 1 and 2.

<Method of Measuring Residual Adhesion>

The TESA-7475 tape after the peel test was rested on a stainless steel plate and press bonded thereto by moving a tape roller of 2 kg over one back-and-forth stroke. Using a tensile tester, the TESA-7475 tape was peeled from the plate at an angle of 180° and a rate of 0.3 m/min. The (re-release) force required for peeling again was measured, from which a residual adhesion was computed according to the following formula. The results are shown in Tables 1 and 2.

Residual adhesion (%)=(re-release force)/(release force)×100

TABLE 1

| Silicone composition, | Example | | | |
|---|---|---|---|---|
| amount (pbw) | 1 | 2 | 3 | 4 |
| Mist suppressant Synthesis Example 1 | 1 | 2 | — | — |
| Synthesis Example 2 | — | — | 2 | — |
| Synthesis Example 3 | — | — | — | 2 |
| Divinyldimethylpolysiloxane | 100 | 100 | 100 | 100 |
| Methylhydrogenpolysiloxane | 2.7 | 2.7 | 2.7 | 2.7 |
| Ethynyl cyclohexanol | 0.4 | 0.4 | 0.4 | 0.4 |
| Complex salt of chloroplatinic acid/vinyl siloxane | 2 | 2 | 2 | 2 |

TABLE 1-continued

| Silicone composition, | Example | | | |
|---|---|---|---|---|
| amount (pbw) | 1 | 2 | 3 | 4 |
| Evaluation results | | | | |
| Silicone composition viscosity (mm$^2$/s) | 370 | 362 | 392 | 381 |
| Misting (max over 180 sec, mg/m$^3$) | 27 | 12 | 14 | 10 |
| Surface state of coated sample | ○ | ○ | ○ | ○ |
| Release force (gf/25 mm) | 12 | 11 | 11 | 11 |
| Residual adhesion (%) | 97 | 96 | 97 | 96 |

TABLE 2

| Silicone composition, | Comparative Example | | | |
|---|---|---|---|---|
| amount (pbw) | 1 | 2 | 3 | 4 |
| Mist suppressant Synthesis Example 4 | 2 | — | — | — |
| Synthesis Example 5 | — | 2 | — | — |
| Synthesis Example 6 | — | — | 2 | — |
| Divinyldimethylpolysiloxane | 100 | 100 | 100 | 100 |
| Methylhydrogenpolysiloxane | 2.7 | 2.7 | 2.7 | 2.7 |
| Ethynyl cyclohexanol | 0.4 | 0.4 | 0.4 | 0.4 |
| Complex salt of chloroplatinic acid/vinyl siloxane | 2 | 2 | 2 | 2 |
| Evaluation results | | | | |
| Silicone composition viscosity (mm$^2$/s) | 375 | 378 | 361 | 377 |
| Misting (max over 180 sec, mg/m$^3$) | 135 | 110 | 52 | 150 |
| Surface state of coated sample | X | X | Δ-○ | X |
| Release force (gf/25 mm) | 14 | 14 | 12 | 15 |
| Residual adhesion (%) | 97 | 96 | 97 | 96 |

The invention claimed is:

1. A method for preparing an organopolysiloxane composition comprising the steps of: effecting addition reaction of an organopolysiloxane of structure having the formula (1) and an organohydrogenpolysiloxane of structure having the formula (2) in a solvent in the presence of a platinum group metal base compound, the amount of the solvent being 10 to 50 times the total weight of the polysiloxanes of formulae (1) and (2), to form a product, adding the organopolysiloxane of structure having the formula (1) and the organohydrogenpolysiloxane of structure having the formula (2) again to the product, effecting addition reaction in the presence of the platinum group metal base compound, repeating at least one time the addition and reaction steps, thereby yielding an organopolysiloxane crosslinked product, $$M_\alpha M^{Vi}_\beta D_\gamma D^{Vi}_\delta T_\epsilon T^{Vi}_\zeta Q_\eta \quad (1)$$

$$M_\theta M^H_\iota D_\kappa D^H_\lambda T_\mu T^H_\nu Q_\eta \quad (1)$$

wherein M is $R_3SiO_{1/2}$, $M^{Vi}$ is $R_2PsiO_{1/2}$, D is $R_2SiO_{2/2}$, $D^{Vi}$ is $RPSiO_{2/2}$, T is $RSiO_{3/2}$, $T^{Vi}$ is $PSiO_{3/2}$, $M^H$ is $R_2HSiO_{1/2}$, $D^H$ is $RHSiO_{2/2}$, $T^H$ is $HSiO_{3/2}$, Q is $SiO_{4/2}$, R is each independently a substituted or unsubstituted $C_1$-$C_{12}$ monovalent hydrocarbon group free of aliphatic unsaturation, P is an alkenyl group: —$(CH_2)_a$—CH=$CH_2$ wherein a is 0 or an integer of 1 to 6, α, β, γ, δ, ε, ζ, η, θ, ι, κ, λ, μ, and ν are each independently 0 or a positive number, β, δ and ζ are not equal to 0 at the same time, β+δ+ζ≥2, ι, λ, and ν are not equal to 0 at the same time, ι+λ+ν≥2, β+δ+ζ and ι+λ+ν are not equal to 2 at the same time.

2. The method of claim 1 wherein the addition reaction of first stage has a conversion rate of at least 90%.

3. The method of claim 1 wherein a solvent having a boiling point of 50° C. to 200° C. is used as the solvent in the amount of 10 to 50 times the total weight of the polysiloxanes of formulae (1) and (2), addition reaction is effected plural divided times, and after the organopolysiloxane crosslinked product is obtained, vinylmethylpolysiloxane is added thereto and the solvent is then removed.

4. The method of claim 2 wherein a solvent having a boiling point of 50° C. to 200° C. is used as the solvent in the amount of 10 to 50 times the total weight of the polysiloxanes of formulae (1) and (2), addition reaction is effected plural divided times, and after the organopolysiloxane crosslinked product is obtained, vinylmethylpolysiloxane is added thereto and the solvent is then removed.

* * * * *